US012126950B2

(12) United States Patent
Kole et al.

(10) Patent No.: US 12,126,950 B2
(45) Date of Patent: Oct. 22, 2024

(54) COMBINED SEAL AND DAMPER FOR VERTICALLY ORIENTATED WOOFER MODULE

(71) Applicant: APPLE INC., Cupertino, CA (US)

(72) Inventors: Jared M. Kole, San Jose, CA (US); Paul J. Thompson, Mountain View, CA (US); Craig M. Stanley, Campbell, CA (US); Meiting Wu, San Jose, CA (US); Jason C. Della Rosa, Morgan Hill, CA (US); Alexander R. Gould, Campbell, CA (US)

(73) Assignee: APPLE INC., Cupertino, CA (US)

( * ) Notice: Subject to any disclaimer, the term of this patent is extended or adjusted under 35 U.S.C. 154(b) by 232 days.

(21) Appl. No.: 17/984,112

(22) Filed: Nov. 9, 2022

(65) Prior Publication Data

US 2024/0015425 A1 Jan. 11, 2024

Related U.S. Application Data

(60) Provisional application No. 63/368,024, filed on Jul. 8, 2022.

(51) Int. Cl.
*H04R 1/02* (2006.01)
*H04R 1/28* (2006.01)

(52) U.S. Cl.
CPC ............. *H04R 1/025* (2013.01); *H04R 1/026* (2013.01); *H04R 1/2888* (2013.01); *H04R 1/2896* (2013.01)

(58) Field of Classification Search
CPC ...... H04R 1/00; H04R 1/025; H04R 2201/00; H04R 1/026; H04R 1/2888; H04R 1/2896
USPC .......... 381/345, 386, 87, 332, 334, 335, 336
See application file for complete search history.

(56) References Cited

U.S. PATENT DOCUMENTS

| | | | |
|---|---|---|---|
| 10,609,473 B2 | 3/2020 | Stanley et al. | |
| 10,652,650 B2 | 5/2020 | Johnson et al. | |
| 11,310,585 B2 | 4/2022 | Della Rosa et al. | |
| 2018/0091878 A1* | 3/2018 | Della Rosa ............ | H04R 1/025 |

* cited by examiner

*Primary Examiner* — Norman Yu

(74) *Attorney, Agent, or Firm* — Kilpatrick Townsend & Stockton LLP

(57) ABSTRACT

A unitary elastomeric structure comprising: an annular body having an inward facing annular channel formed in an upper portion of the body and an annular sealing structure formed in a lower portion of the body, wherein the annular sealing structure is concentric with and radially within the annular channel; and a plurality of grommets disposed radially around and integrally formed with the annular body, wherein each grommet has opposing upper and lower surfaces and a bore extending through the grommet between the upper and lower surfaces.

18 Claims, 9 Drawing Sheets

COMBINED SEAL AND DAMPER FOR VERTICALLY ORIENTATED WOOFER MODULE

This present application claims priority to U.S. Provisional Patent Application No. 63/368,024, filed Jul. 8, 2022, entitled "Combined Seal And Damper For Vertically Orientated Woofer Module," which is herein incorporated by reference in its entirety for all purposes.

BACKGROUND

Speakers, such as compact voice-activated/smart speakers, are becoming a common household item where many households have at least one or more such devices. Such compact, voice-activated speakers allow a user to listen to and control music playback, access the internet and control various home automation devices in response to voice commands that follow an initial command phrase. While there are a number of different compact smart speakers on the market, new and improve speaker designs are continuously being sought.

BRIEF SUMMARY

This disclosure describes various embodiments of a compact electronic speaker. Embodiments of the disclosed speaker can have a small footprint while also accurately reproducing music and other audio streams. In some embodiments, the speaker can include a vertically mounted low frequency driver, for example, a woofer or subwoofer, and an annular, elastomeric damper coupled between the low frequency driver and a housing of the speaker. The damper isolates vibrations generated by the low frequency driver helping to ensure the speaker does not generate rattling or other undesirable noises and/or does not shift or hop across the supporting surface due to such vibrations.

In some embodiments, a unitary elastomeric structure is provided that includes: an annular body having an inward facing annular channel formed in an upper portion of the body and an annular sealing structure formed in a lower portion of the body, wherein the annular sealing structure is concentric with and radially within the annular channel; and a plurality of grommets disposed radially around and integrally formed with the annular body, wherein each grommet has opposing upper and lower surfaces and a bore extending through the grommet between the upper and lower surfaces.

According to some embodiments, a speaker includes: a speaker housing, a unitary elastomeric structure, a low frequency driver and a plurality of fasteners. The speaker housing can define an interior cavity and include at least first and second housing portions coupled together to define at least a portion of the interior cavity. The unitary elastomeric structure can include an annular body and a plurality of grommets disposed radially around and integrally formed with the annular body. The annular body can have an inward facing annular channel formed in an upper portion of the body and an annular sealing structure formed in a lower portion of the body that is concentric with and radially within the annular channel. Each grommet in the plurality of grommets can have a bore extending between opposing upper and lower surfaces. The low frequency driver can include a diaphragm coupled to an annular flange having an outer perimeter disposed within the annular channel and the low frequency driver can be oriented vertically within the interior cavity such that the diaphragm and annular flange are perpendicular to a longitudinal axis of the speaker. The plurality of fasteners can couple the first housing portion to the second housing portion with each fastener in the plurality of fasteners extending through the bore of one of the grommets in the plurality of grommets compressing its respective grommet between the first and second housing portions.

In various implementations, the unitary elastomeric structure can include one or more of the following features. The Each grommet can include a first plurality of teeth distributed radially about its upper surface. Each grommet can further include a second plurality of teeth distributed radially about its lower surface. Each grommet can have a height, extending between its upper and lower surfaces, that is greater than a thickness of the annular body. Each grommet can have a collar indentation aligned with the annular channel and extending around at least three sides of the grommet. The annular channel can have a rear surface opposite an annular opening of the channel that is interrupted at each grommet such that the annular channel has open regions extending a set distance to left and right sides of each grommet. The unitary elastomeric structure can further include an annular speaker surround extending inward from the annular body and defining a central opening. The annular speaker surround can have an annular arched portion disposed between the central opening and the annular body.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use the same reference numbers, the elements are generally either identical or at least similar in function or purpose.

BRIEF DESCRIPTION OF THE DRAWINGS

The disclosure will be readily understood by the following detailed description in conjunction with the accompanying drawings, wherein like reference numerals designate like structural elements and in which.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessary obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Speaker configurations tend to be overly large when high quality audio playback is desired and the audio output can be very directional in nature. This can require a user to be positioned in one particular location to get a desired quality level of audio content generated by the speakers. For example, a multi-channel speaker setup could require speakers to be mounted in multiple different corners of a room to achieve a substantially uniform distribution of sound within the room.

One way to reduce the size of a speaker configuration and simplify speaker setup while maintaining an even distribution of sound within a room, is to package multiple mid to high frequency drivers into a single housing along with a single low frequency driver. The mid to high frequency drivers can be arranged in an array and distributed radially about the speaker device so that audio exit channels associated with the drivers are distributed at a regular radial interval along a periphery of the speaker device while the low frequency driver can be positioned above or below the array and oriented vertically. The vertical orientation of the low frequency driver and compact size of the speaker can present some challenges related to the direction in which the mass of the low frequency driver oscillates, however, that are solved by embodiments disclosed herein.

Example Speaker

Figure 1:
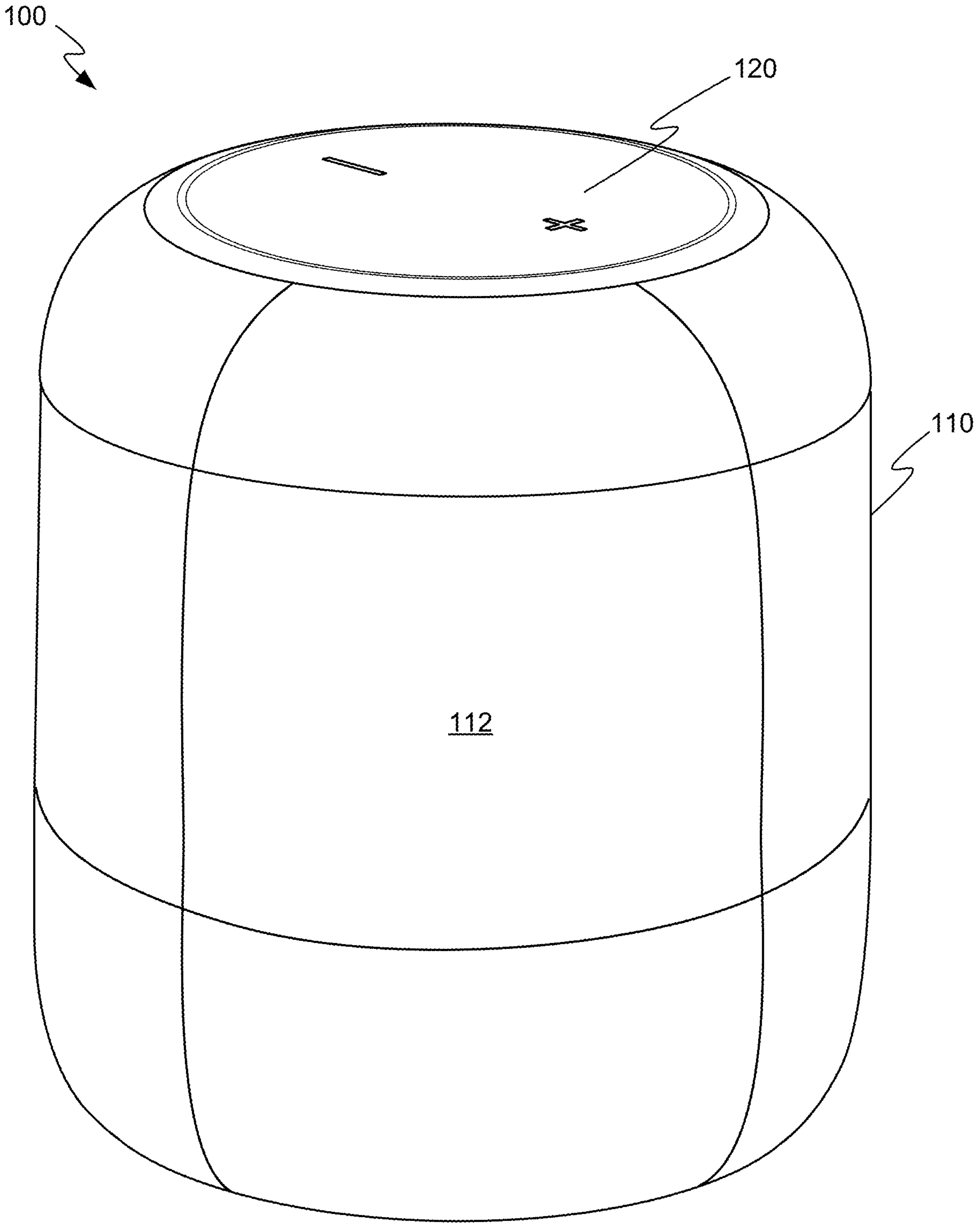
FIG. 1 is a simplified perspective view of a smart speaker according to some embodiments.

FIG. 1 shows a simplified perspective view of an speaker 100 according to some embodiments. Speaker 100 can include a body 110 having an unbroken, aesthetically pleasing exterior surface with a symmetrical and generally spherical shape. For example, body 110 can have an outer surface in which the points along given horizontal cross-sections through body 110 are equidistance from a central longitudinal axis extending through the body perpindicular to the cross-sections. The shape of body 110 can be primarily defined by a housing (not visible in FIG. 1) that, in the depicted embodiment, has a symmetric substantially cylindrical geometry. As used herein, the term "substantially cylindrical geometry" refers to both a geometry that is completely cylindrical (i.e., a geometry that includes straight parallel sides and has a circular or oval cross-section) as well as a geometry in which the sides of the top and/or bottom edges are tapered and rounded more than an actual cylinder. Embodiments are not limited to any particular shape of speaker 100, however, and speakers in accordance with other embodiments can have any appropriate shape, including as non-limiting examples, a spherical geometry or a cubical geometry among others.

In some embodiments, speaker 100 can include an array of mid to high frequency drivers (not visible in FIG. 1) arranged around a central, longitudinal axis that can be, for example, disposed within a lower portion of body 110. The audio drivers in the array can be disposed within body 110 at regular radial intervals and each of the audio drivers can be configured to generate audio waves that exit the housing through acoustic vents defined by a downward facing end of the housing. In such a configuration, beamforming techniques can be applied to improve audio performance by, adjusting audio exiting from adjacent audio exit openings in order to generate constructively interference. In one particular embodiment, the mid to high frequency drivers can be positioned in a circular arrangement within a cylindrical housing to achieve an even radial distribution of sound. Destructive interference caused by reflections from the support surface on which the device is positioned can be prevented by orienting the audio exit openings next to the support surface.

In some embodiments, the acoustic vents (not visible in FIG. 1), along with a majority of speaker 100 can be concealed by an acoustic fabric 112 that provides a consistent exterior surface for speaker 100 for a pleasant aesthetic appearance. Acoustic fabric 112, which can be attached to the housing that defines the shape of body 110, can be made from a woven mesh or similar structure that has minimal impact on the volume and/or quality of audio exiting speaker 100. For example, audio waves exiting speaker 100 can pass through acoustic fabric 112 without any interference. In some embodiments, acoustic fabric 112 can have a pattern specifically chosen and designed to conceal components or features position beneath the acoustic fabric.

Speaker 100 can also include a low frequency audio driver (e.g., a woofer or subwoofer, also not visible in FIG. 1) for improved audio quality. The low frequency audio driver can be disposed in an upper portion of body 110 and arranged in a plane generally perpendicular to a longitudinal axis of speaker 100 such that the low frequency driver can be said to be vertically-oriented. That is, the low frequency audio driver can include a diaphragm that oscillates in a direction aligned with the longitudinal axis of speaker 100. In such an arrangement, the low frequency audio driver can generate vibrations that could potentially cause undesirable buzzing within or motion of speaker 100. To reduce or prevent such undesirable effects, embodiments disclosed herein can attach the low frequency driver to housing components of speaker 100 using a damper that includes multiple elastomeric grommets. The damper, which is described in detail below, can reduce the amount of vibrations imparted to the rest of speaker 100 by the low frequency audio driver.

An upper portion of array speaker 100 can include a user interface 120. User interface 120 can allow a user to adjust settings for speaker 100. For example, track selection and changes in volume can be handled by interacting with user interface 120. In some embodiments, user interface 120 can take the form of a touch sensitive surface. User interface 120 can include one or more light sources that illuminate various regions of user interface 120 to help a user interact with user interface 120.

Figure 2:
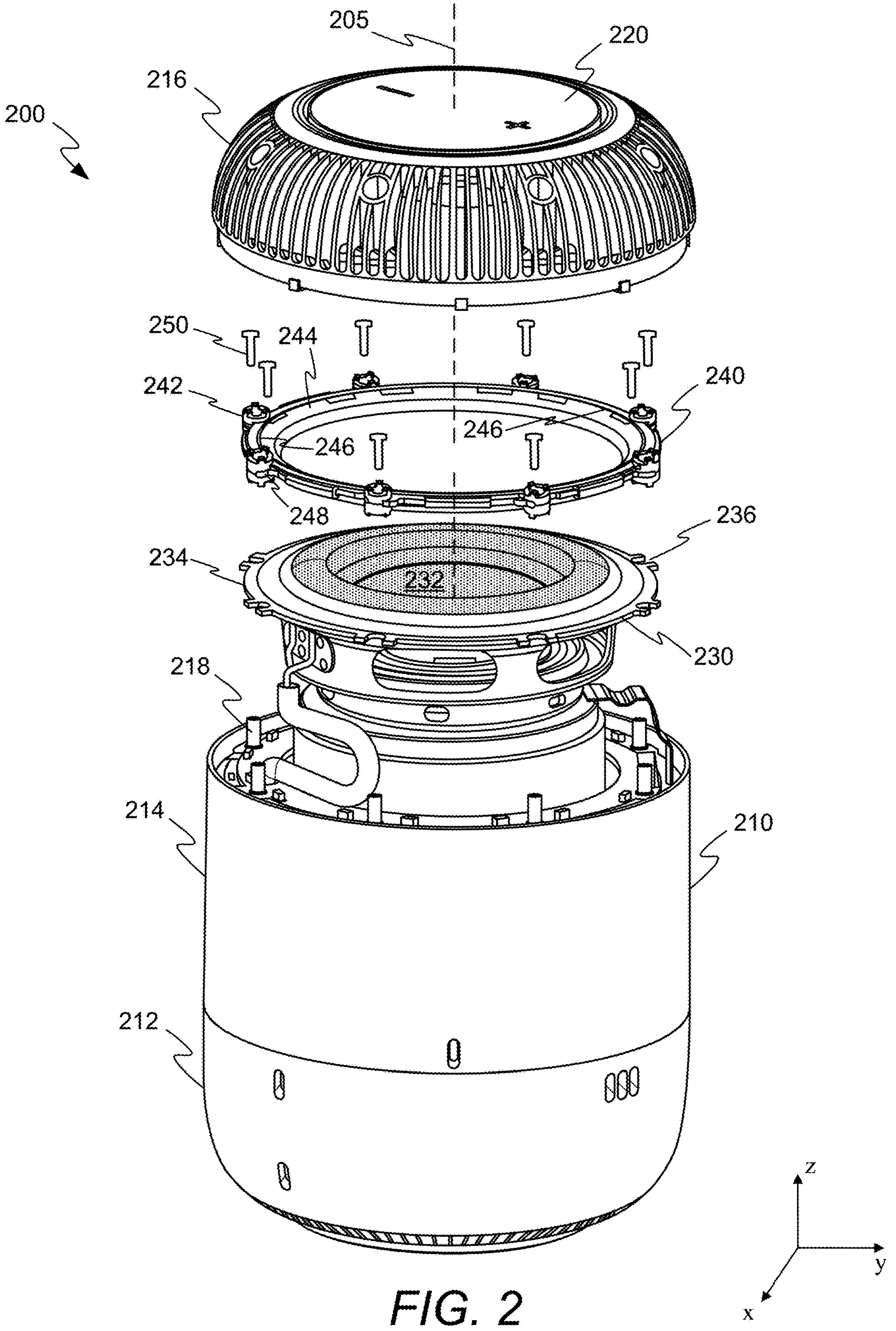
FIG. 2 is a simplified exploded view of various components housed inside a smart speaker according to some embodiments.

FIG. 2 is a simplified partially exploded view of speaker 200 and various components of the speaker according to some embodiments. Speaker 200, which is shown in FIG. 2 without an acoustic fabric covering the outer surface of a housing 210, can be representative of speaker 100 discussed above with respect to FIG. 1. As depicted, housing 210 can include three separate portions: a lower housing 212, a middle housing 214 and an upper housing 216 that essentially define the shape of speaker 200. In FIG. 2, lower housing 212 and middle housing 214 are shown coupled together while upper housing 216 is in a spaced apart relationship with the middle housing prior to a final assembly stage. The housing enclosure portions 212, 214, 216 can be coupled together using any suitable attachment technique or mechanism. For example, in some embodiments the housing components can be joined together by one or more of the following: mechanical fasteners, such as screws, bolts, wire fasteners or the like, an adhesive glue or an adhesive tape, or by laser or ultrasonic welding or the like. In some embodiments, each housing portion is configured to fit over, around, and/or under one another while giving the appearance of a smooth and seamless junction between the connection points of each housing portion to one another. An acoustic fabric (e.g., acoustic fabric 112 discussed above with respect to FIG. 1) can be wrapped around housing 210 to provide a consistent and aesthetically pleasing exterior finish and surface while concealing potential seams in the housing, various audio ports and other components of speaker 200. While housing 210 is depicted as including three separate housing portions, in other embodiments housing 210 can include fewer than or more than three separate portions.

Speaker 200 can also include, among other components, a touch module 220, a low frequency driver 230 and an array of mid to high frequency drivers disposed within the middle and lower housing portions 214, 216 and thus not visible in FIG. 2. Touch module 220 can be coupled to upper housing portion 216. The touch module 220 allows a user to interact with and control various features of speaker 200 according to some embodiments. Touch module 220 can be, for example, a touch sensitive input device and can include a display that presents information and/or controls (e.g., volume controls) to a user.

Low frequency driver 230, which in various embodiments can be considered a woofer or a subwoofer, lies in plane perpendicular to and is centered within housing 210 on a central longitudinal axis 205 of speaker 200. The low frequency driver includes a diaphragm 232 and an annular flange 234 that extends around an outer periphery of the low frequency driver. The driver 230 also includes a magnet and other components, which are not readily visible in FIG. 2. The annular flange 234 is used to secure low frequency driver 230 to portions of housing 210 and, towards that end, includes multiple c-shaped notches 236 arranged around its outer periphery that are sized and shaped to receive fasteners as described below.

When in use, the inertia of the moving mass of low frequency driver 230 creates forces in the Z axis and moments about the X and Y axes, which can lead to visible shaking and potentially to hopping of speaker 200. This could result in speaker 200 moving laterally while playing music and become a drop hazard. The motion generated by low frequency driver 230 can also create vibrations throughout speaker 200, which can cause audible rattling or buzzing noises and potentially result in premature component failure or disconnection. Vertical motion of array speaker in the Z axis can also make it difficult to accurately interface with touch interface 220 positioned on the top of speaker 200. For example, vertical motion of speaker 200 could cause a user to touch the wrong portion of the touch interface or to make an input earlier than otherwise desired.

Damper 240 has been engineered and designed to minimize or completely prevent such potential problems. Damper 240 is a singular, unitary piece of elastomeric material that both dampens oscillations generated by low frequency driver 230 and creates an acoustic seal between the front and back volumes of the low frequency driver. Damper 240 includes multiple grommets 242 arranged around an annular body 244 that can be coupled between middle and upper housing portions 214, 216 by fasteners 250 that extend through grommets 242 into mounting structures/bosses 218. Each grommet 242 can be made from the same elastic material and have a specific geometry to achieve optimal stiffness properties to dampen oscillations generated by low frequency driver 230 as discussed in more detail below. In the depicted embodiment, each fastener 242, which can be a screw or any other appropriate mechanical fastener, can extend through a hole (not visible in FIG. 2) in upper housing 216 and into a corresponding mounting structure/boss 218 that can be, for example, part of the middle housing portion 214.

Damper 240 also includes an annular channel 246 formed along an inner perimeter of an upper portion of the damper. In some embodiments damper 240 is too small to fit over annular flange 234 except for the fact that the damper is made from an elastomeric material that can be stretched. Once stretched, annular channel 246 fits over the outer perimeter of annular flange 234 tightly securing the damper to the flange and each grommet 242 sits within one of the c-shaped notches 236 disposed around an outer perimeter of annular flange 234. In some embodiments, grommets 242 include a collar 248 formed along at least three of its sides that align with and act as extensions of annular channel 246 to better secure each grommet within its respective notch 236. The grommets can then be slide over their respective bosses 218 and the middle and upper housing portions 214, 216 can be attached together by fasteners 250 with damper 240 positioned between the two housing portions. Further details of damper 240 and its associated features are described below in conjunction with FIGS. 3A to 7.

Example Damper

Figure 3A:
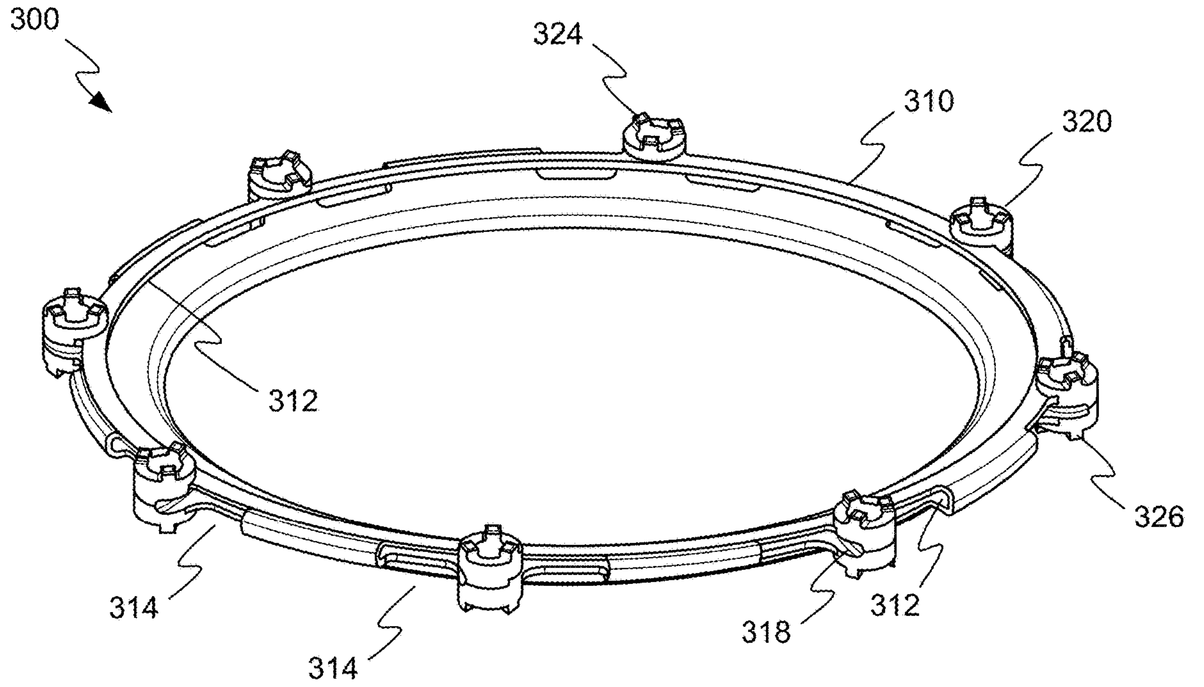
FIG. 3A is a simplified top perspective view of a damper according to some embodiments.
Figure 3B:
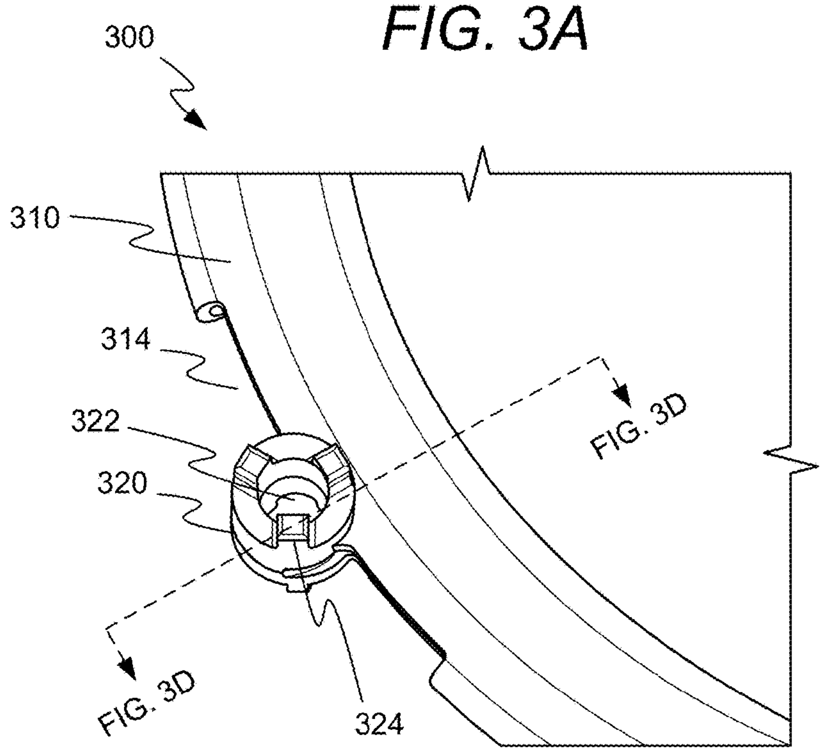
FIG. 3B is a simplified perspective view of a portion of the damper shown in FIG. 3A.
Figure 3C:
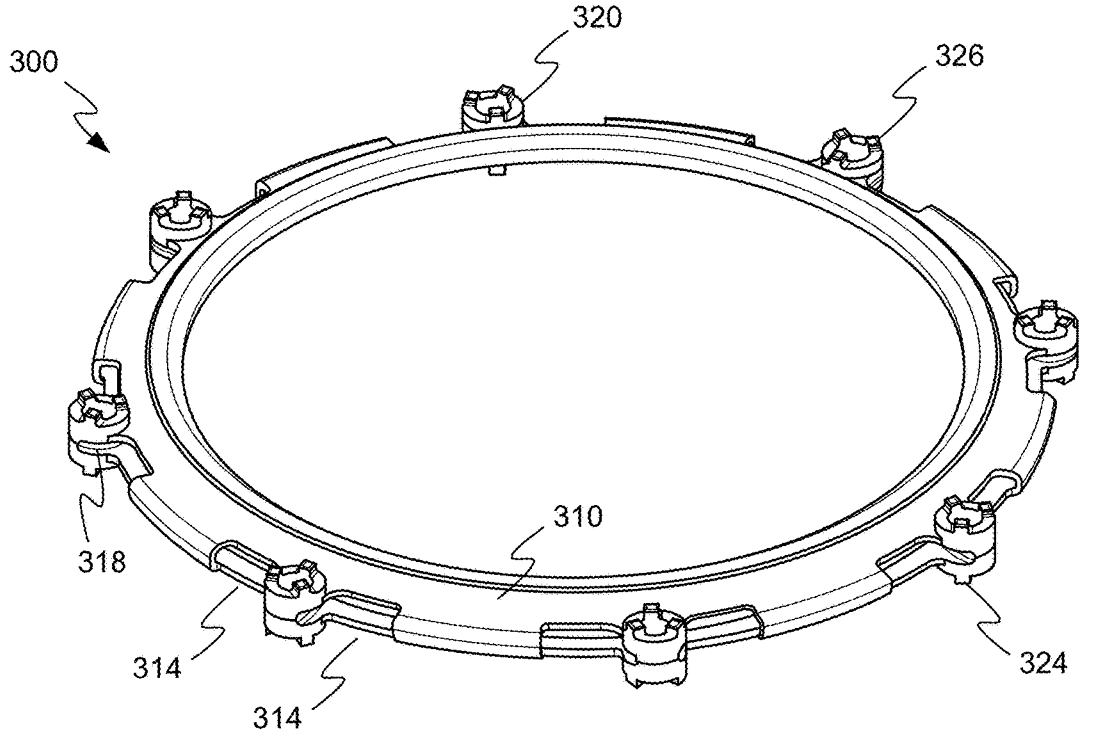
FIG. 3C is a simplified bottom perspective view of the damper shown in FIG. 3A.
Figure 3D:
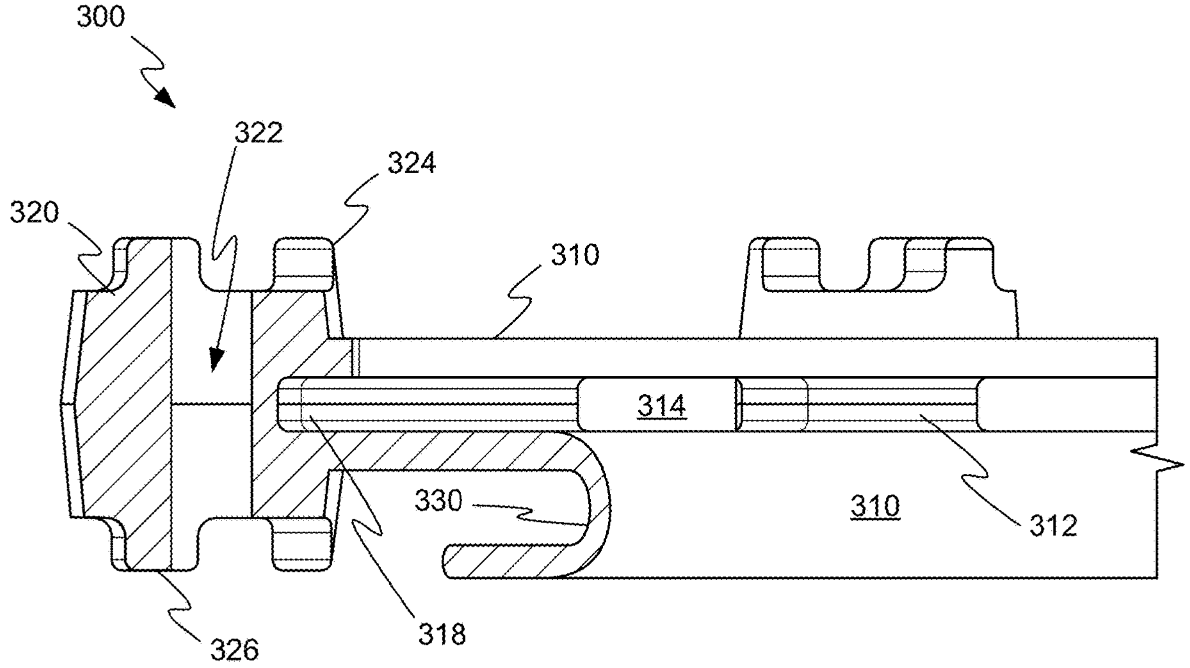
FIG. 3D is a simplified cross-sectional view of a portion of the damper shown in FIG. 3A.

Referring first to FIGS. 3A-3D where FIG. 3A is a simplified top perspective view of a damper 300 according to some embodiments, FIG. 3B is a simplified perspective view of a portion of damper 300, FIG. 3C is a simplified is a simplified bottom perspective view of damper 300, and FIG. 3D is a simplified cross-sectional view of a portion of damper 300. Damper 300 can be representative of damper 200 depicted in FIG. 2.

As shown in FIGS. 3A-3D, damper 300 is an integrated, unitary structure includes an annular body 310 (e.g., body 244) with multiple grommets 320 distributed radially around its outer perimeter. In the depicted embodiments damper 300 includes eight grommets 320 but embodiments are not limited to any particular number of grommets and some embodiments can include fewer than eight grommets while other embodiments can include more than eight grommets. Also, while the grommets 320 are spaced apart from each other at equal radial distances in the depicted embodiment, in other embodiments the grommets can be spaced apart from each other in a different arrangement.

Body 310 defines an annular channel 312 along an upper portion of its inner perimeter (e.g., annular channel 246) and each grommet 320 includes a collar 318 (e.g., grove 248) around its inner and side surfaces that is aligned in the same plane as annular grove 312. As depicted, the annular channel 312 has a rear surface, opposite the inward facing opening of the channel, that is partially interrupted at each grommet 320 by an open section 314 on each side of each grommet. Open sections 314 allow a hard stop (shown in and discussed with respect to FIG. 7) to directly contact the annular flange of the low frequency driver (e.g., annular flange 234) in situations where higher than normal forces act upon the low frequency driver (e.g., in a drop event) that might cause the driver to otherwise damage damper 300.

As described above, damper 300 can be a single, integrally formed component that can be both structurally stronger than a similar structure made out of multiple, separate components and less expensive to manufacture. Damper 300 can be made from an elastomeric or similar material, such as silicone or rubber and, in some embodiments, has a durometer between 30 to 70 and in other embodiments has a durometer between about 35 to 50. In some embodiments, damper 300 is fabricated with a single shot compression molding process but damper 300 can be formed using any suitable method including various double shot processes where one or more portions of damper 300 have a different durometer than other portions of the damper.

As shown more clearly in FIG. 3B, each grommet 320 includes a central bore or hole 322 that extends through the entire height (length) of the grommet. Each bore 322 is sized to fit around one of the boss 218 structures discussed above with respect to FIG. 2. Thus, in an embodiment with eight grommets 320, middle housing 214 can include eight bosses 218. Each grommet 320 can optionally include one or more teeth 324 protruding from its upper surface as well as one or more teeth 326 (FIG. 3C) protruding from its lower surface. The teeth 324, 326 can designed and fabricated to compress more easily when the upper and middle housing sections are coupled together as described below. The height and/or width of teeth 324, 326 can be tuned to adjust the overall stiffness provided by the grommets.

In addition to dampening movement and vibrations from the low frequency driver, damper 300 serves a dual purpose of isolating the back volume of the low frequency driver from its front volume. Towards this end, and as shown more clearly in FIG. 3D, body 310 also includes a sealing section 330 that in the depicted embodiment is in the form of an annular c-shaped section that extends around an inner perimeter of damper 300 below channel 312. Sealing section 330 is concentric with and radially within annular channel 312. As discussed in more detail below, when damper 300 is properly positioned between the upper and middle housing portions, an upper face of sealing section 300 contacts a lower surface of annular flange 234 and a lower face of sealing section 300 contacts a portion of the middle housing 214 providing an acoustic seal that acoustically separates the back volume of low frequency driver 230 from the front volume of the driver.

Figure 4:
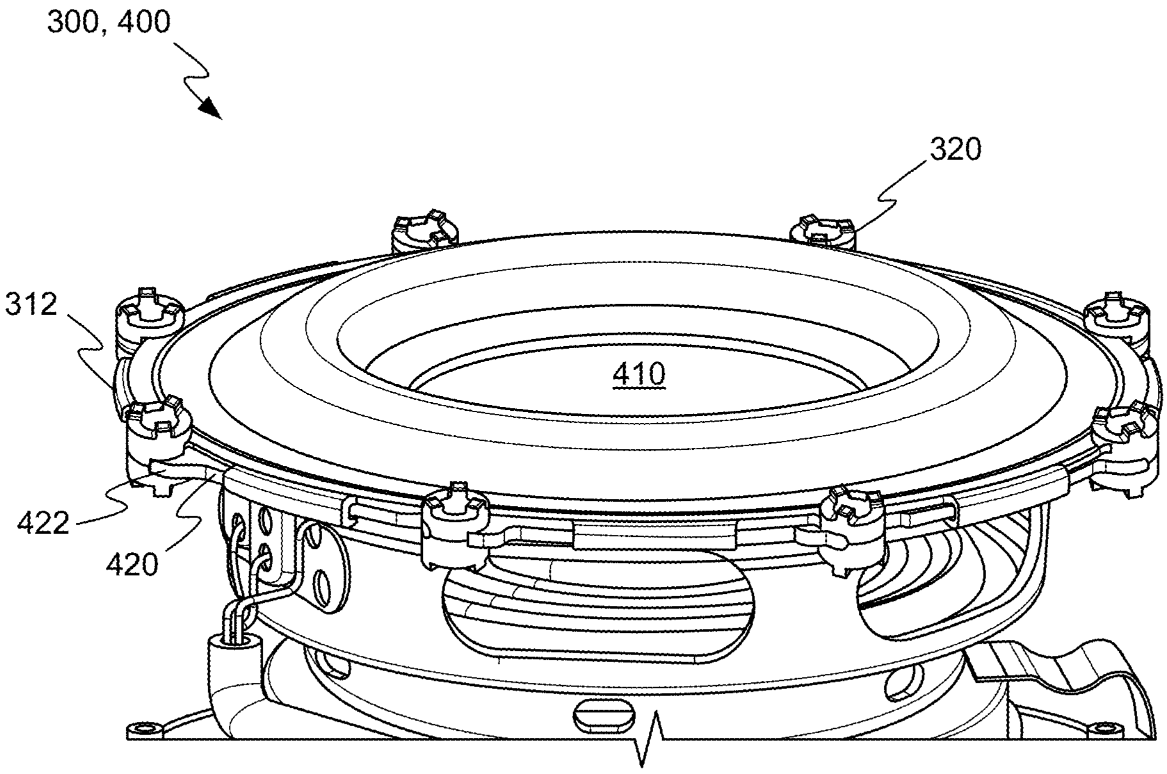
FIG. 4 is a simplified perspective view illustration depicting a damper according to some embodiments disclosed herein attached to a low frequency driver.
Figure 5:
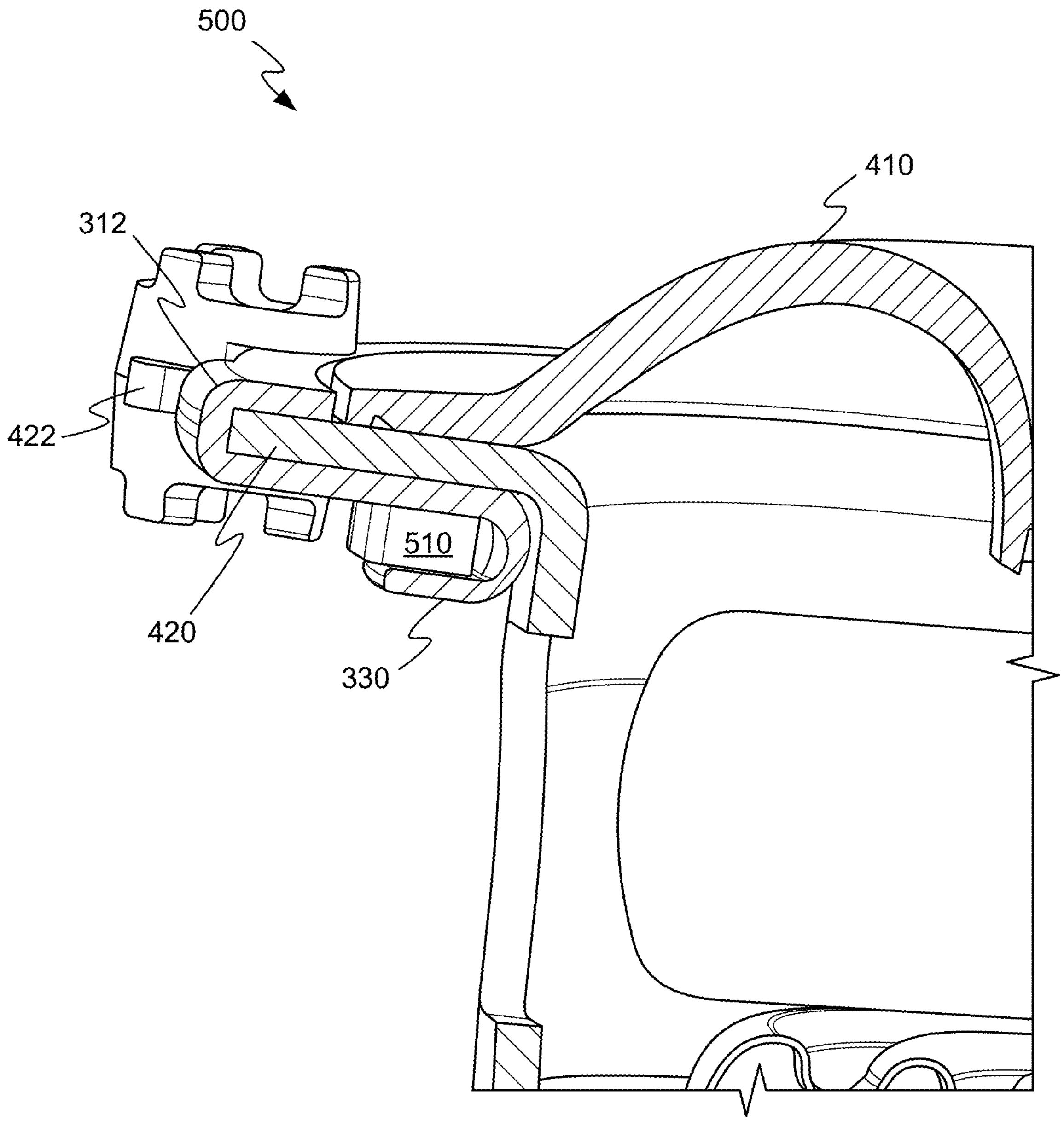
FIG. 5 is a simplified cross-sectional view of a portion of the damper and low frequency driver shown in FIG. 4.

Referring now to FIGS. 4 and 5 in which FIG. 4 is a simplified perspective view illustration depicting damper 300 attached to a low frequency driver 400 and FIG. 5 is a simplified cross-sectional view of a portion of the damper 300 and low frequency driver 400 shown in FIG. 4. Low frequency driver 400 can be representative of low frequency driver 230 shown in FIG. 2. Visible in FIG. 4 are the diaphragm 410, annular flange 420, and other components of the low frequency driver 400 as well as portions of damper 300. As mentioned above, in some embodiments damper 300 is smaller than the annular flange 420 of low frequency driver 400. Thus, as shown in FIGS. 4 and 5, damper 300 is in a stretched state where sections of the damper that define annular channel 312 are stretched and fitted over an outer edge of annular flange 420.

Each grommet 320 also includes a c-shaped collar (e.g., collar 318 shown in FIGS. 3C and 3D) that allows the grommet to be positioned within one c-shaped notches (e.g., notches 236) of the annular flange such that the collar 318, which extends around the opposing sides of the grommet, accepts the opposing arms 422 of annular flange that define c-shaped notches. When the annular flange 420 is engaged within the c-shaped collar of the grommets 320, the shape of the c-shaped collar acts as an anti-rotation feature that prevents the grommet twisting within its respective notch. Since damper 300 is made from an elastomeric material, this can be helpful when driving screws (e.g., fasteners 250) into their respective mounting features.

Damper 300 also includes a sealing section 330 that contributes to the suspension force provided by grommets 320 but has a primary purpose of providing an acoustic seal between annular flange 420 and part of a speaker housing. In the depicted embodiment, sealing section 330 is a annular c-shaped portion formed in a lower portion of body 310. In some embodiments, an annular low-compression foam ring 510 is positioned the upper and lower legs of sealing section 330 as depicted in FIG. 5. Annular foam ring 510 biases c-shaped sealing section with an outward force and the durometer and size and shape of foam ring 510 can be selected to provide the desired amount of biasing force. Annular foam ring 510 is optional as some embodiments do not require any biasing of sealing structure and still other embodiments can include one or more ribs or other structures along an inner surface of the c-shaped sealing structure 330 to increase the stiffness of structure 330 instead of annular foam ring 510.

Figure 6:
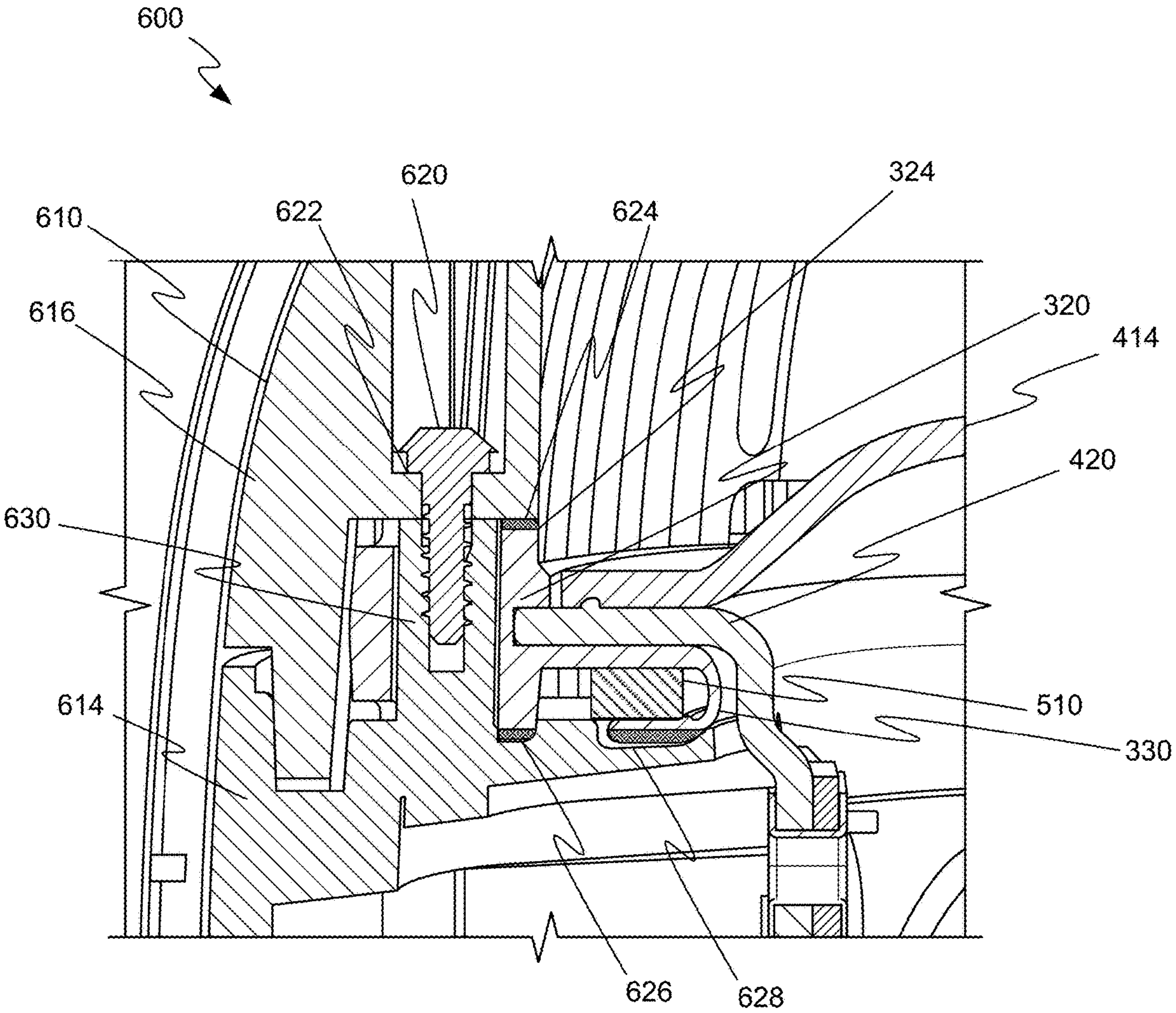
FIG. 6 is simplified cross-sectional illustration of a portion of a damper and low frequency driver within a speaker according to some embodiments.

FIG. 6 is simplified cross-sectional diagram of a portion of damper 300 and low frequency driver 400 mounted within a housing 610 of a speaker 600 according to some embodiments. Speaker housing 610, which can be representative of housing 210, includes a middle housing portion 614 and an upper housing portion 616. As shown, a screw 620 (e.g., one of fasteners 250) is threaded into a mounting structure 630. Mounting structure 630 serves a dual purpose of locating grommet 320 and is thus sometimes referred to herein as “boss 630”.

When screw 620 is tightened, a shoulder of the screw contacts a shelf of upper housing portion 616 and forces the upper housing portion towards the middle housing portion clamping the middle and upper housing portions 614, 616 together. Grommet 320 extends between opposing faces 624, 626 on the two housing portions 614, 616, respectively, such that when screw 620 is tightened, the faces 624, 626 are moved closer together compressing grommet 320 (as shown by the dotted patterned sections at the edges of grommet 300 contacting faces 624, 626 as well as face 628). In this manner, screw 620 can be set to a predetermined depth within mounting structure 630 to provide a desired amount of pre-compression at face locations 624, 626.

As discussed above, in some embodiments grommet 320 can have one or more teeth 324, 326 protruding away from its upper and lower surfaces, respectively. In such embodiments, it is the teeth 324, 326 that contact faces 624, 626. The size, shape and number of teeth 324, 326 in each grommet 320 can be selected to provide a desired amount of stiffness in the grommets 320 when compressed. Note that while only a single grommet 320 is shown in FIG. 6, damper 300 can include multiple grommets spaced along its outer radius apart and speaker 600 can include a mounting structure 622 for each grommet.

As discussed above, damper 300 also includes a c-shaped sealing section 330 with an annular low-compression foam ring 510 positioned between the upper and lower halves of sealing section 330. C-shaped sealing structure 330 extends between annular flange 410 and middle housing portion 614. The front volume of low frequency driver 400 is above sealing section 330 within an area enclosed by upper housing portion 616 while the back volume of the low frequency driver is below annular flange 410 within an area enclosed by middle housing portion 614 and a lower housing portion (not shown). Sealing structure 330 provides an acoustic seal between the two speaker volumes for improved audio performance. In the depicted embodiment, middle housing portion 614 includes a shelf with an annular indentation that accepts a lower surface of sealing structure 330 to provide an improved acoustic seal.

Figure 7:
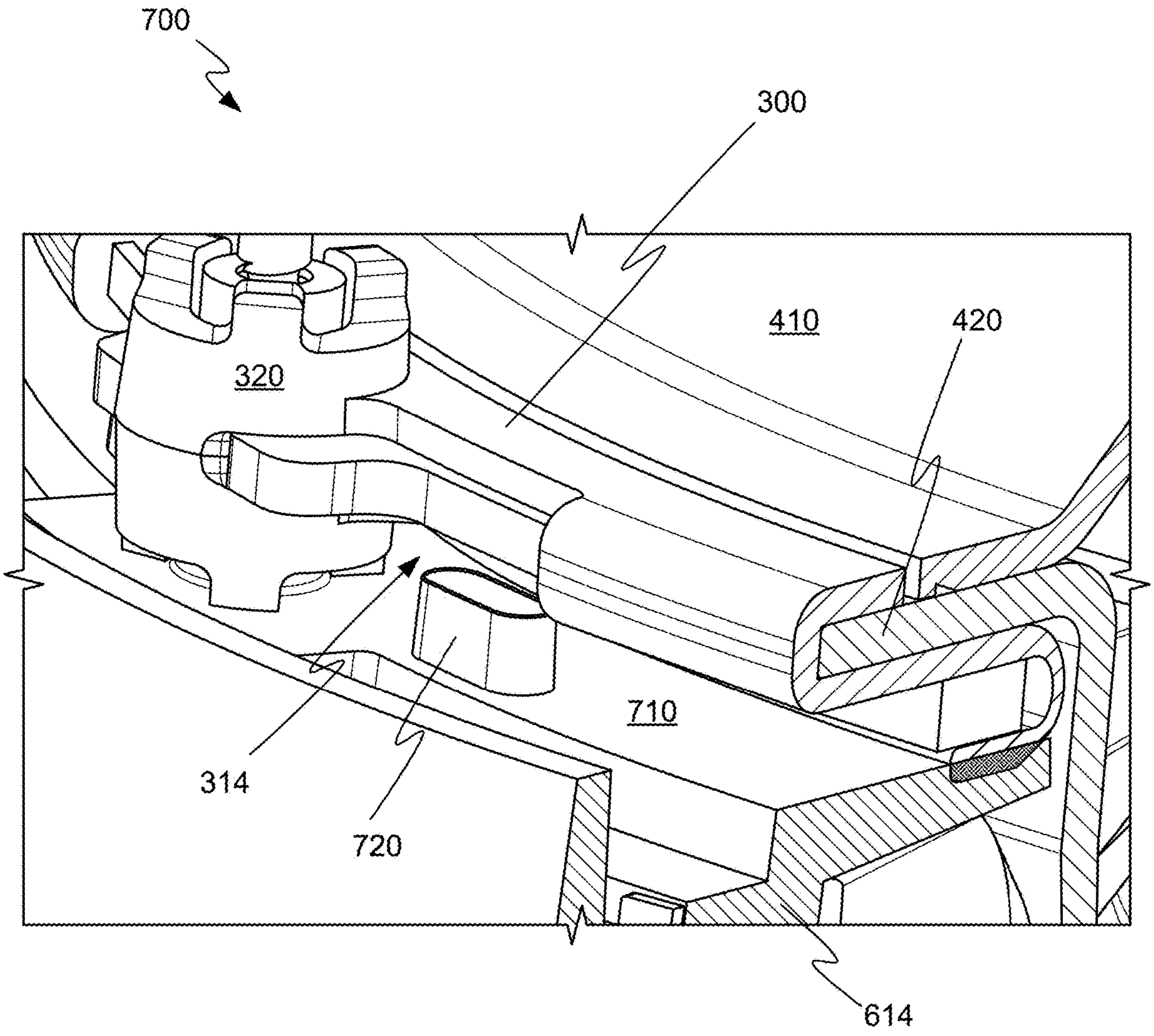
FIG. 7 is a simplified cross-sectional perspective illustration of a portion of the damper and low frequency driver within the speaker shown in FIGS. 6A and 6B according to some embodiments.

FIG. 7 is a simplified cross-sectional perspective illustration of a portion of a speaker 700 that includes damper 300 and low frequency driver 400 according to some embodiments. As shown in FIG. 7, a stopper 720 is positioned directly beneath, and in a spaced apart relationship with, annular flange 420 in the area in which one of the open sections 314 is formed in damper 300. Thus, stopper 720 is formed on and protrudes away from a shelf 710 of middle housing portion 614. Stopper 720 is positioned directly below a surface of annular flange 420 without any portion of damper 300 between the two components. If the speaker shown in FIG. 7 is subject to a drop or similar event in which low frequency driver 400 is subject to strong forces that would move the driver vertically, in a downward direction, within the speaker housing, the annular flange 420 will contact stopper 720 limiting the forces under which damper 300 and grommet 320 are subjected to. A similar stopper (not shown in FIG. 7) can be positioned above damper 300 in a strategic location that allows the stopper to limit the vertical movement of the low frequency driver in an upward direction. In this manner the lower and upper stoppers can prevent damage to damper 300 that might otherwise occur during a drop or similar event.

Combination Low Frequency Surround, Seal and Damper

To further reduce the complexity and cost of vertically oriented low frequency drivers (e.g., woofers), some embodiments combine the innovative damper discussed above (e.g., damper 300 that combines a low frequency driver suspension and seal as discussed with respect to FIGS. 3A-3D) into the surround of the low frequency driver. To illustrate, reference is made to FIGS. 8 and 9 where FIG. 8 is a simplified top perspective cross-sectional view of a combined low frequency surround, damper and seal 800 according to some embodiments, and FIG. 9 is a simplified perspective view illustration depicting the low frequency surround, damper and seal shown in FIG. 8 attached to additional components of the low frequency driver 900.

Low frequency surround, damper and seal 800 can be a single, integrally formed component that can be both structurally stronger than a similar structure made out of multiple, separate components and less expensive to manufacture. Low frequency surround, damper and seal 800 can be made from an elastomeric or similar material, such as silicone or rubber.

Figure 8:
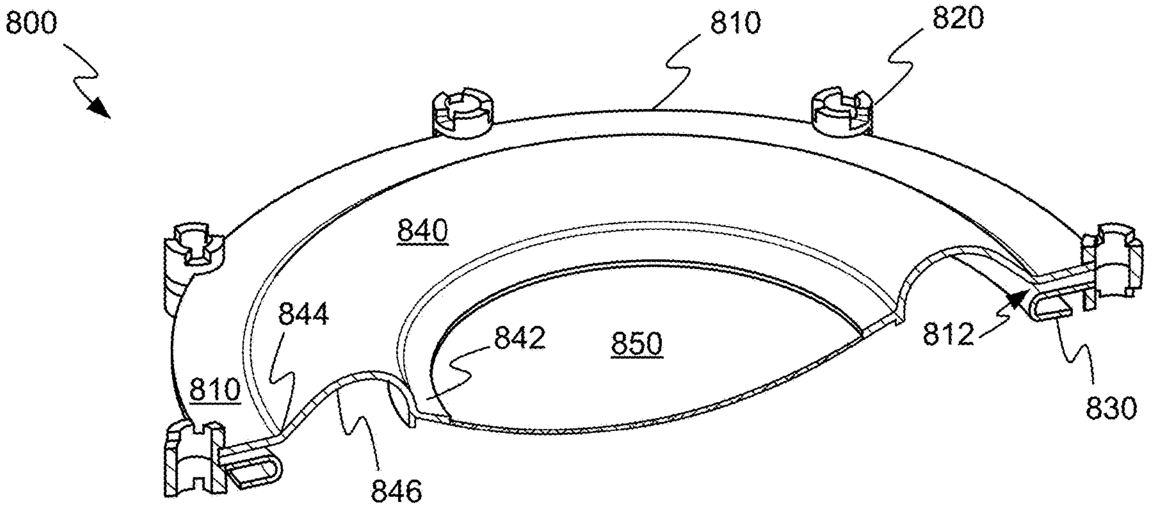
FIG. 8 is a simplified top perspective view of a combined low frequency surround, damper and seal according to some embodiments.
Figure 9:
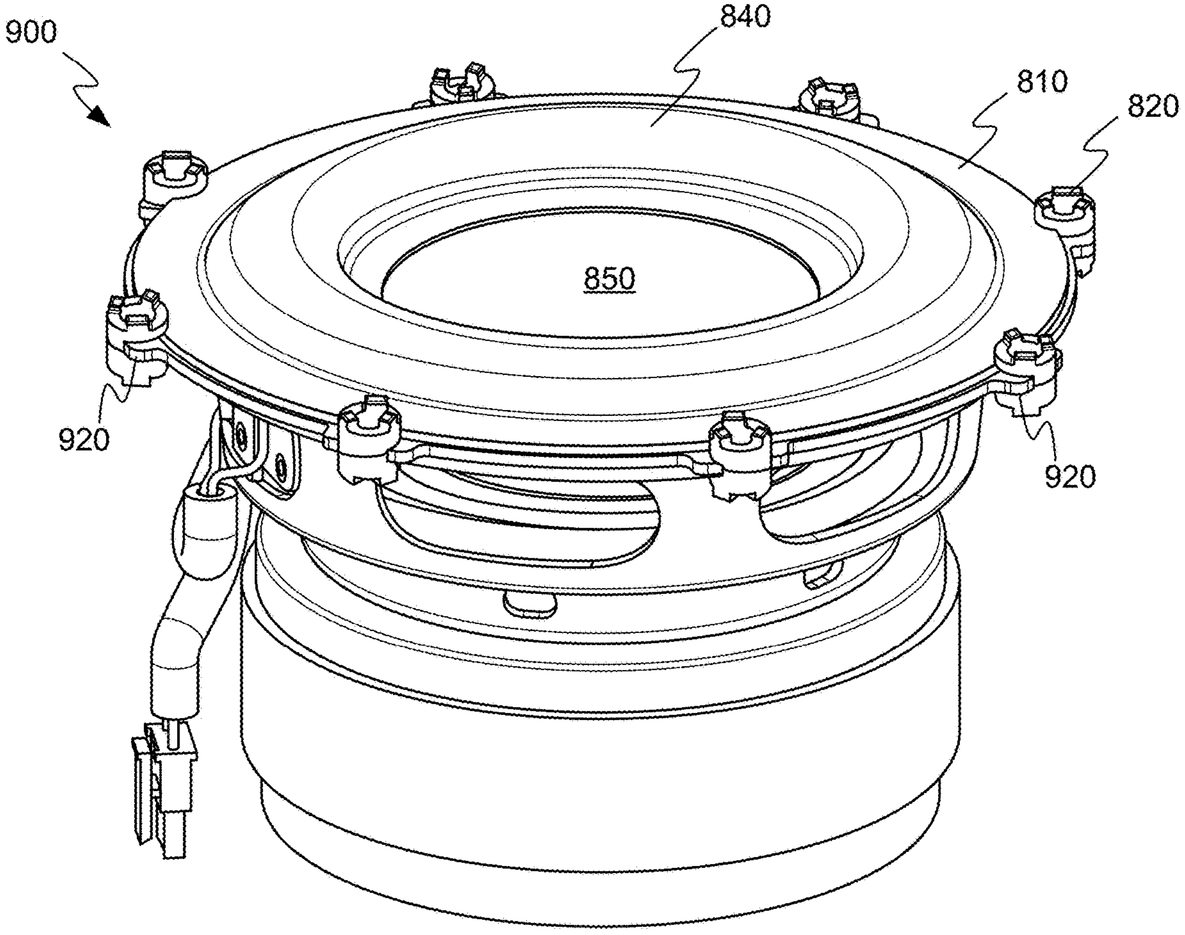
FIG. 9 is a simplified perspective view illustration depicting a combined low frequency surround, damper and seal according to some embodiments disclosed herein attached to additional components of the low frequency driver.

As shown in FIG. 8, low frequency surround, seal and damper 800 is an integrated, unitary structure includes all the same elements as damper 300 discussed above (including an annular body 810 having multiple grommets 820 distributed around its outer perimeter) combined with a surround portion 840 of a low frequency driver. Annular body 810 and grommets 820 can be similar to annular body 310 and grommets 320, respectively. The annular body 810 can define an annular channel 812 that can be wrapped around a flange portion 920 of low frequency driver 900 as discussed below with respect to FIG. 9. Low frequency surround, seal and damper 800 also includes a sealing section 830 that is similar to sealing section 330 described above and that provides an acoustic seal between annular flange 920 and part of a speaker housing.

Surround 840 can be attached (e.g., with an appropriate adhesive) at its inner periphery 842 to speaker cone 850. At its outer periphery 844, surround 840 can extend into and be integrated with annular body 810. Between the inner periphery 842 and outer periphery 844, surround 840 can include an annular arched portion 846 that extends outward, away from the voice coil of low frequency driver 900. During operation of the low frequency driver, surround 840 can flex, allowing the cone 850 to move in response to movement of the speaker voice coil. Surround 840 is important to the proper function of low frequency driver 900. By combining the elastomer surround with the grommet and seal features, embodiments are able to have a stand-alone low frequency driver module with both sealing and suspension.

Referring to FIG. 9, low frequency driver 900 includes low frequency surround, seal and damper 800 coupled between speaker cone 850 (i.e., a diaphragm) and an annular flange 920, as well as various other components. Similar to damper 300, low frequency surround, seal and damper 800 has a slightly smaller diameter than the annular flange 920. Thus, as shown in FIG. 9, low frequency surround, seal and damper 800 is in a stretched state where sections of the device that define annular channel 812 are stretched and fitted over an outer edge of annular flange 920.

The embodiment shown in FIGS. 8 and 9 is illustrative only. Thus, while in the depicted embodiment, low frequency surround, seal and damper 800 includes eight grommets 820, it is to be understood that embodiments are not limited to any particular number of grommets and some embodiments can include fewer than eight grommets while other embodiments can include more than eight grommets. Also, while the grommets 820 are spaced apart from each other at equal radial distances in the depicted embodiment, in other embodiments the grommets can be spaced apart from each other in a different arrangement.

Additional Embodiments

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling operation of the disclosed speaker. In some embodiments, the computer readable medium can include code for interacting with other connected devices within a user's home. For example, speaker 100 could be configured to use its ambient light sensor to identify human activity and to learn when to activate and deactivate certain devices within the user's home. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings. For example, while embodiments described above indicated the grommets can have a variety of different configurations, in number, shape and size of teeth extending from upper and/or lower surfaces of the grommets to adjust the overall stiffness provided by the damper and thus optimize its dampening capabilities, in some embodiments the grommets can have generally planar upper and lower surfaces without any protruding teeth. As another example, sealing structure 330 is depicted above as being an annular, outwardly facing c-shaped portion of damper 300. The sealing structure is not limited to this particular shape, however, and in other embodiments can take any appropriate shape providing the sealing structure creates an acoustic seal between the front and back volumes of the low frequency driver. Non-limiting examples of other suitable cross-sectional shapes for sealing structure 300 include an inward facing c-shaped structure, an s-shaped structure and a z-shaped structure along with any other suitable annular structure that has an appropriately low stiffness.

Additionally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. Speaker components comprising:

a unitary elastomeric structure comprising:

an annular body having an inward facing annular channel formed in an upper portion of the body and an annular sealing structure formed in a lower portion of the body, wherein the annular sealing structure has a c-shaped cross-section and is concentric with and radially within the annular channel; and a plurality of grommets disposed radially around and integrally formed with the annular body, wherein each grommet has opposing upper and lower surfaces and a bore extending through the grommet between the upper and lower surfaces; and a low frequency driver having a diaphragm coupled to an annular flange having an outer perimeter disposed within the annular channel.

2. The speaker components set forth in claim 1 wherein the c-shaped cross-section of the annular sealing structure faces outward in a direction opposite that of the annular channel.

3. The speaker components set forth in claim 1 wherein each grommet includes a first plurality of teeth distributed radially about its upper surface.

4. The speaker components set forth in claim 3 wherein each grommet further includes a second plurality of teeth distributed radially about its lower surface.

5. The speaker components set forth in claim 1 wherein each grommet has a height, extending between its upper and lower surfaces, that is greater than a thickness of the annular body.

6. The speaker components set forth in claim 1 wherein each grommet has a collar indentation aligned with the annular channel and extending around at least three sides of the grommet.

7. The speaker components set forth in claim 1 wherein the annular channel has a rear surface opposite an annular opening of the channel that is interrupted at each grommet such that the annular channel has open regions extending a set distance to left and right sides of each grommet.

8. A unitary elastomeric structure comprising:

an annular body having an inward facing annular channel formed in an upper portion of the body and an annular sealing structure formed in a lower portion of the body, wherein the annular sealing structure has a c-shaped cross-section and is concentric with and radially within the annular channel;

a plurality of grommets disposed radially around and integrally formed with the annular body, wherein each grommet has opposing upper and lower surfaces and a bore extending through the grommet between the upper and lower surfaces; and an annular speaker surround extending inward from the annular body and defining a central opening, the annular speaker surround having an annular arched portion disposed between the central opening and the annular body.

9. A speaker comprising:

a speaker housing defining an interior cavity, the speaker housing having at least first and second housing portions coupled together to define at least a portion of the interior cavity;

a unitary elastomeric structure comprising an annular body and a plurality of grommets disposed radially around and integrally formed with the annular body, wherein the annular body has an inward facing annular channel formed in an upper portion of the body and an annular sealing structure formed in a lower portion of the body that has a c-shaped cross-section and is concentric with and radially within the annular channel, and wherein each grommet in the plurality of grommets has a bore extending between opposing upper and lower surfaces;

a low frequency driver having a diaphragm coupled to an annular flange having an outer perimeter disposed within the annular channel, wherein the low frequency driver is oriented vertically within the interior cavity such that the diaphragm and annular flange are perpendicular to a longitudinal axis of the speaker; and a plurality of fasteners that couple the first housing portion to the second housing portion, wherein each fastener in the plurality of fasteners extends through the bore of one of the grommets in the plurality of grommets and compresses its respective grommet between the first and second housing portions.

10. The speaker set forth in claim 9 wherein the speaker housing further includes a third housing portion with the first housing portion being an upper housing portion, the second housing portion being a middle housing portion and the third housing portion being a lower housing portion.

11. The speaker set forth in claim 10 wherein the annular sealing structure is compressed between a lower surface of the annular flange and a shelf of the middle housing portion.

12. The speaker set forth in claim 9 wherein the second housing portion includes a plurality of mounting structures extending upward towards the first housing portion and located in an annular arrangement, wherein each mounting structure is aligned with one of the grommets in the plurality of grommets and sized and shaped to fit within the bore of its respective grommet.

13. The speaker set forth in claim 9 further comprising an array of audio drivers arranged radially around a central longitudinal axis of the speaker.

14. The speaker set forth in claim 13 wherein each audio driver in the array of audio drivers is a mid or high frequency driver.

15. The speaker set forth in claim 13 wherein the low frequency driver is disposed above the array of audio drivers.

16. The speaker set forth in claim 9 wherein further comprising an annular foam ring disposed between first and second opposing surfaces of the annular c-shaped sealing structure.

17. The speaker set forth in claim 9 wherein each grommet has a height, extending between its upper and lower surfaces, that is greater than a thickness of the annular body.

18. The speaker set forth in claim 9 wherein each grommet has a collar indentation aligned with the annular channel and extending around at least three sides of the grommet.

* * * * *